Oct. 31, 1933.　　　R. F. POLLARD ET AL　　　1,932,909
EDUCATIONAL APPARATUS
Filed July 11, 1932
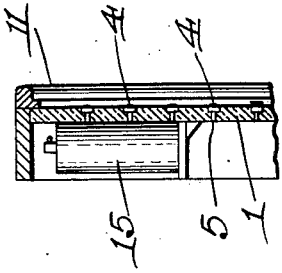
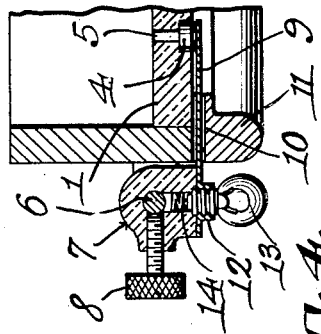
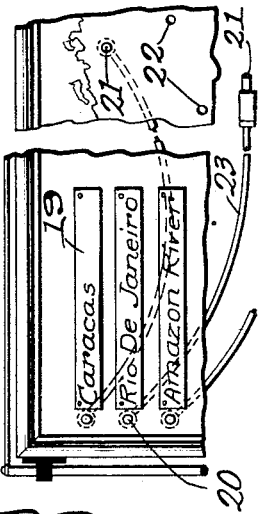
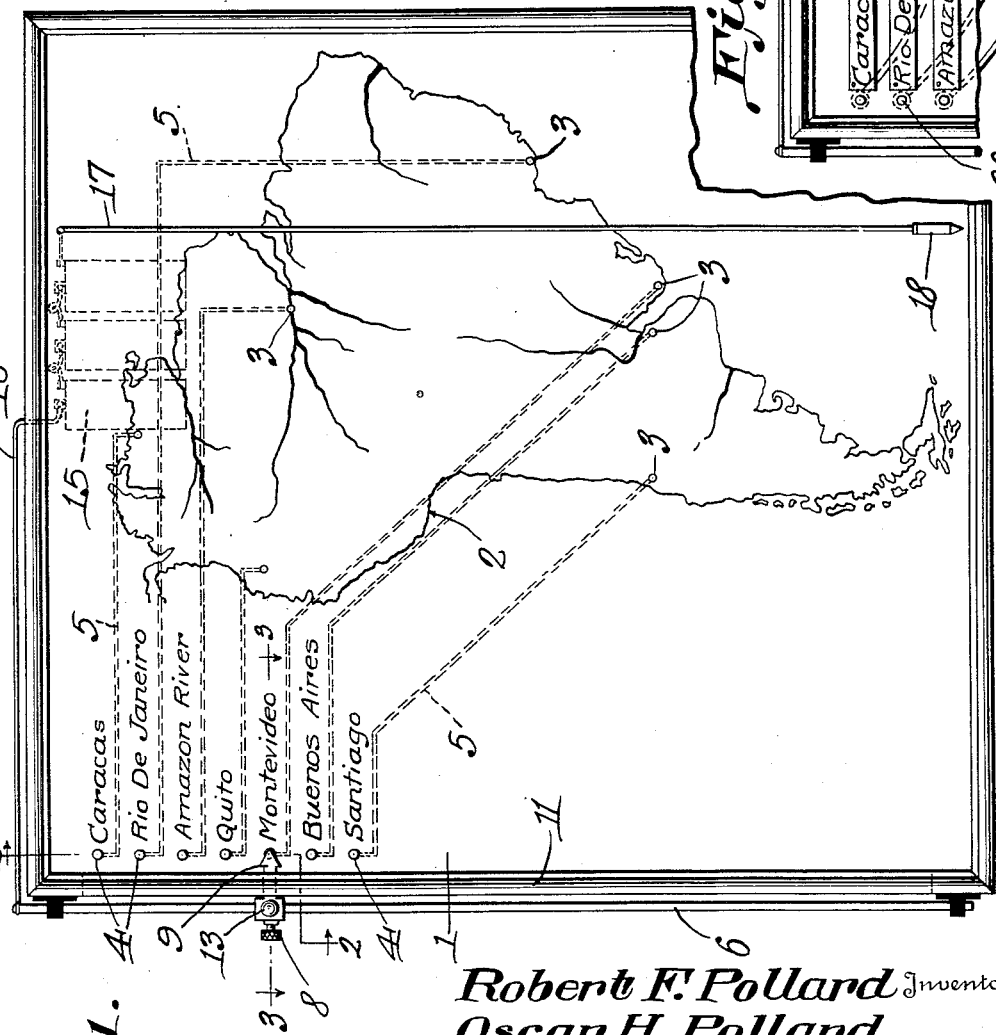
Robert F. Pollard  
Oscar H. Pollard  
Inventors
By C. A. Snow & Co.  
Attorneys Patented Oct. 31, 1933

1,932,909

UNITED STATES PATENT OFFICE 1,932,909

EDUCATIONAL APPARATUS

Robert F. Pollard and Oscar H. Pollard, Indianapolis, Ind.

Application July 11, 1932. Serial No. 621,984

1 Claim. (Cl. 35—6)

This invention relates to educational apparatus, one of its objects being to provide a chart which, while more especially designed for use in giving instruction in geography can, nevertheless, be used in connection with other branches of education.

A further object is to provide a chart having an electrically operated signal device which can be actuated when any point on the chart is touched to indicate the answer to a question asked.

A still further object is to provide a list of questions or the like arranged on the chart any one of which can be designated by an adjustable indicator which will remain in indicating position after such adjustment, the proper positioning of the indicator serving to close a gap in a circuit leading to the signal device, there being additional means under the control of the pupil whereby when a predetermined point on the chart is touched in answer to the indicated question the circuit to the signal device will be closed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred forms of the invention have been shown.

In said drawing:

Figure 1 is an elevation of a portion of a chart embodying the present improvements and adapted to be used when giving instruction in geography.

Figure 2 is a section on line 2—2, Figure 1.

Figure 3 is a section on line 3—3, Figure 1.

Figure 4 is an elevation of a portion of a modified form of the chart.

Referring to the figures by characters of reference, 1 designates a chart of any desired size, proportions and material. In the present instance the chart is in the form of a panel on which is displayed a map 2 and at proper points on this map are located contacts 3 coinciding with the location of points of interest to be designated in the course of the study of the map.

At any other desired point on the chart is a list of geographical names of those points indicated by the contacts 3 and adjacent to each of these names is another contact 4 electrically connected, as by a concealed wire 5 to the point 3 to which the associated name refers.

A conductor 6 in the form of a rod, is mounted along one side of the chart and is insulated therefrom. This rod constitutes a guide for a slide 7 preferably of insulated material which carries a set screw 8 or the like whereby the slide can be fastened in any desired position. An indicating finger 9 of conducting material extends from the slide and is adapted to work in a slot 10 formed in the border frame 11 of the chart. This finger is adapted to engage any one of the contacts 4 and has a socket 12 for the reception of an incandescent lamp 13 or any other suitable signal device. One terminal of the lamp bears against a resilient contact 14 which bears against the rod 6.

The panel 1 is formed preferably of an insulating material so that there can be no shorting between the different contacts 3. A battery 15 can be located back of the panel with one pole electrically connected, as at 16, to the rod 6 while the other pole is connected to a board 17 supported on the front face of the panel 1 and carrying a terminal contact 18 which can be in the form of a pencil or the like. The rod is of such length as to permit the user of contact 18 to reach any one of the contacts 3.

In practice the pupil grasps the pointer or contact 18, the teacher moves slide 6 until the finger 9 engages the contact 4 opposite the geographical point to be indicated, and the pupil then touches the contact 3 located at the place which he believes should be designated by the indicated name. If the proper contact 3 is touched a circuit will be completed to the signal device 13 which will thus be energized. After the slide has once been set it will remain in position without the fatigue to the teacher which would be incident to holding a pointer continuously in engagement with one contact until one of a number of pupils properly pointed out the location of the designated point.

As shown in Figure 4 the names used on the chart can be arranged on detachable panels 19 mounted on the chart. Thus they can be made interchangeable. Furthermore, the contacts 20 adjacent to these names and the contacts 21 located at the points to be designated can be in the form of removable contact plugs insertible into openings 22 in the panel. Each plug 21 can be connected to its contact plug 20 by wire 23. These wires and plugs can be located back of the panel and after the name panels have been placed in position the teacher can properly place the plugs to insure operation of the signal device when the proper points have been indicated by the pupil.

While this invention has been shown adapted for use in the instruction of geography, it is to be understood that it can also be used in connection with charts employed for giving instruction in mathematics, languages and other studies.

What is claimed is:

An educational chart including a panel having separate series of contacts, shiftable means for designating the respective contacts of one series, a slidable contact for engaging any one of the designated contacts, interchangeable means for electrically connecting any one of the designated contacts of one series to any one of the contacts of the other or undesignated series, a flexibly supported pointer electrically connected to the slidable contact and adapted to close a circuit therethrough when engaged with that contact of the undesignated series joined electrically to that contact of the designated series engaged by the slidable contact, and a signal device adapted to be operated by the closing of the circuit.

ROBERT F. POLLARD.
OSCAR H. POLLARD.